J. DANNER.

Revolving Book-Case.

No. 9,033. Reissued Jan. 6, 1880.

Witnesses:

W. B. Masson

A. P. Cowl

Inventor:

John Danner

By E. E. Masson atty

UNITED STATES PATENT OFFICE.

JOHN DANNER, OF CANTON, OHIO.

REVOLVING BOOK-CASE.

SPECIFICATION forming part of Reissued Letters Patent No. 9,033, dated January 6, 1880.

Original No. 177,479, dated May 16, 1876; Reissue No. 7,523, dated February 20, 1877. Application for Reissue filed September 15, 1879.

*To all whom it may concern:*

Be it known that I, JOHN DANNER, of Canton, in the county of Stark and State of Ohio, have invented certain new and useful Improvements in Revolving Book-Cases; and I do hereby declare that the following is a full, clear, and exact description of the construction and operation of the same, reference being had to the accompanying drawings, making a part of this specification, in which—

Figure 1:
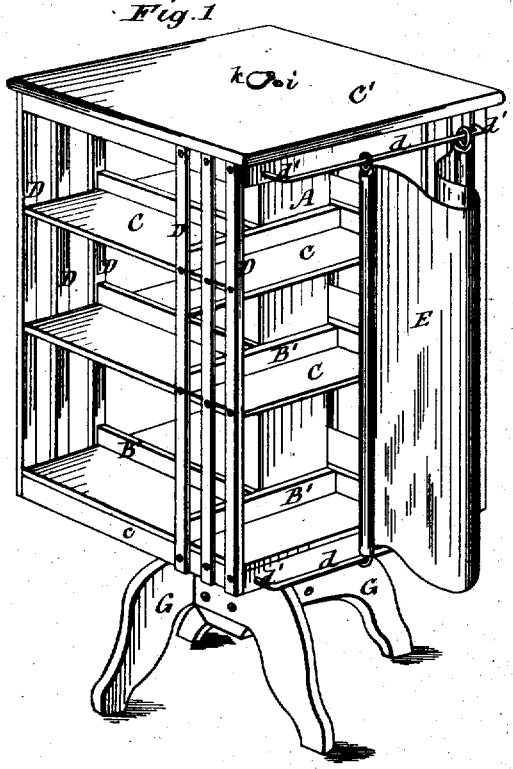
Figure 2:
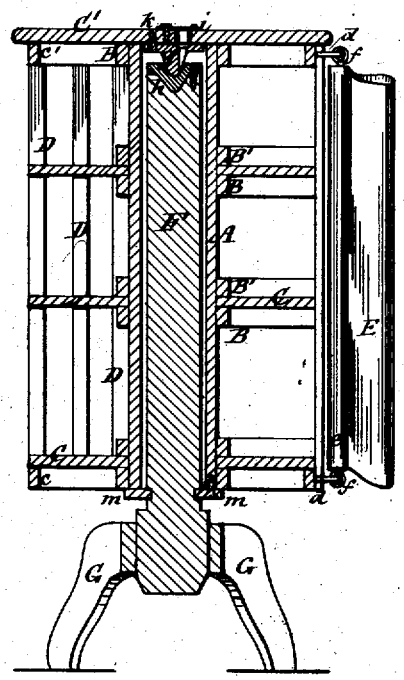
Figure 3:
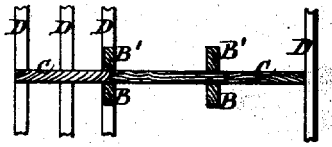
Figure 4:
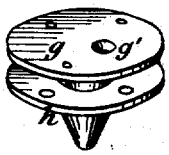

Figure 1 represents, in perspective, one of my improved revolving book-cases. Fig. 2 represents a vertical central section through the same. Fig. 3 represents a vertical section through two contiguous shelves of one of the series, showing the manner in which they are provided with supports for books, how they are supported and have their joints strengthened and covered. Fig. 4 represents, in perspective, the conical spindle and its bearing employed to support the book-case and keep the frictional parts lubricated.

Similar letters of reference where they occur denote like parts in all the figures.

My invention relates to the construction of revolving book-cases.

Heretofore revolving book-cases have been made either circular or in the form of a prism having six, eight, or more sides, approaching as near as possible the form of a cylinder, probably under the supposition that they would meet all the requirements of a revolving book-case. Series of quadrangular shelves gradually diminishing in size, either connected together or each one capable of revolving independently of the other, have also been mounted on or placed around a post to form a conical or pyramidal book-case; but they have soon been found to present some defect, either in their adaptation to carry heavy books or in their want of strength, durability, or simplicity of construction, and, being comparatively impracticable, their sale has been very limited. One of the difficulties has been to reduce the friction and noise produced under the pressure or weight of the books by the contact of the movable and stationary parts. For this purpose friction-rollers have been used upon the frictional parts; but often they only increase the noise, and when lubricants are used they cannot be renewed without taking the frame to pieces, or if an oil-hole is located so as to reach the bearing parts, it must be located where the books are likely to be injured by the oil.

The object of my invention is to produce a revolving book-case that, by its construction, will render the use of friction-rollers unnecessary. It being suspended from the top of a central post extending to the top shelf of the book-case, it possesses a degree of stability that could not be obtained by any other mode of construction.

The object of my invention is also to produce a revolving book-case having a series of shelves made rectangular to facilitate their construction without waste of material and produce convenient rectangular divisions for the reception of books, and also to unite said rectangular shelves to a common hollow shaft, so as to have a firm central support for each; to provide the shelves with vertical strips at or adjacent to each corner as side supports for books; to also provide said shelves with vertically-projecting strips or bars as back-supports for said books, and to give firmness and stability to the whole device by means of a solid quadrangular platform or upper shelf resting on the post, and from which the central hollow shaft and the series of shelves are suspended.

My invention consists in the combination, with the said suspended book-case and its central post, of a perforated pendent spindle attached to the upper part of the book-case, and a conical oil-cup bearing attached to the upper extremity of the post; also, in providing said pendent spindle with an oil-duct, by means of which the frictional parts can easily be kept lubricated and without danger to the books.

My invention further consists in the combination of parts, their form, location, and assemblage in constructing the integral book-case, as will be hereinafter described, and then clearly pointed out in the claims.

To enable others skilled in the art to make and use my invention, I will proceed to describe the same with reference to the drawings.

A represents a vertical hollow shaft, made quadrangular, this form being most convenient, when constructed of lumber, as in the present instance, to be united to the shelves and their supports. To this hollow shaft are attached the horizontal bars B, supporting the inner end of the shelves C of the book-case, while the outer end is partly supported by vertical strips D, suspended from the continuous four-sided platform or top shelf, C′. This top shelf is made solid to produce a substantial bearing and fine finish for the book-case, and also to preserve the contents from falling dust; and as all the boards forming this top shelf can extend across the horizontal bars B, it can be made of any desired strength. It is, moreover, provided with a rim, *c′*, on its under side, that still further adds to its strength, and keeps this quadrangular top shelf from warping. The lower series of shelves are also provided with a rim, *c*, to add to their union and strength and to improve the appearance of the book-case, the rims *c* and *c′* presenting additional surface to fasten the connecting vertical strips D to the top and bottom shelves.

To the rims *c* and *c′* are attached the horizontal rods supporting the curtain E, that may be used to inclose the book-case, if desired. This curtain is preferably fastened to vertical rods *e*, having screw-wings *f* at each of their extremities resting upon the rods *d*.

The rods *d* are bent at a right angle at *d′*, where they form a rest for the screw-rings *f* and retain the curtain in a stretched position.

To the under side of the solid platform or top shelf, C′, is attached a pendent conical spindle, *g*, that rests in an oil-cup bearing, *h*, attached to the top of a cylindrical post, F, that is kept in a vertical position by legs G, attached thereto near its lower extremity. These legs can be made either of wood or metal, and can also be provided with caster-wheels, each leg being preferably secured independently to the central post, so that if one of them should accidentally be broken it can be replaced at little cost.

The pendent spindle *g* is provided with an opening, *g′*, to receive oil for the bearing. A duct, *i*, is located over it in the top shelf, C′, and a cap or cover, *k*, is placed over the duct *i* to exclude the dust.

The intermediate series of shelves (of which there may be as many as desired) between the top and bottom shelves are supported at their inner ends by the transverse bars B and at their outer ends by the vertical strips D, that also retain the books in their places upon the shelves and keep them from falling off.

To strengthen each of the series of shelves, form a back support for the books, and serve as partitions or divisions for the contents of said shelves, and also to cover all the joints, so that hygrometric changes will not affect the complete finish of the book-case, and at the same time preserve the binding of the books from injury against the sharp edges of the joints, I provide the shelves with a series of horizontal strips or bars, B′, that are also secured to the central hollow shaft, A, and thus said shelves are connected, from above by the bars B′ and from under by means of the strips B, with the central support, forming together an unyielding device capable of standing any amount of racking while being shipped or loaded with books without showing any ill effect.

The revolving book-case is connected to the central post, F, by means of the collar *m*, formed of two pieces that embrace the post in an annular groove, *n*.

It is evident that a very convenient wardrobe can be constructed in the same manner as above described by simply omitting the intermediate shelves between the top and bottom of the revolving case, and the curtain, E, surrounding it will form all the covering required.

If the book-case is made low, with only a couple of shelves, it will be found very convenient as a table for a study, and it can then be finished with a marble top or otherwise.

Having now described my invention, what I claim is—

1. In combination with a revolving book-case suspended from the top of a stationary post having an oil-cup bearing, *h*, the pendent spindle *g*, attached to the top shelf of the frame, and oil-duct *i*, constructed substantially as and for the purpose described.

2. In a revolving book-case, the combination of a solid upper shelf, a pendent spindle, *g*, attached to said upper shelf, and a post having an oil-cup bearing in its upper extremity, substantially as and for the purpose described.

3. In combination with a revolving book-case suspended from the top of a stationary post, F, the series of vertical strips D, located at the ends of the shelves adjacent to the corners of the book-case, to support the outer end of the shelves and keep books from falling off, substantially as described.

4. In a revolving book-case, the combination of a series of quadrangular shelves with a series of vertical strips located at the end and adjacent to the corners of said shelves, substantially as and for the purpose described.

5. In combination with the lower shelf or a series of shelves of a revolving book-case, the series of horizontal bars or strips B′, projecting above said shelves, substantially as and for the purpose described.

6. In a revolving book-case, the combination of a quadrangular platform or solid upper shelf, C′, a series of shelves parallel with said platform, a central vertical hollow shaft, A, and a series of horizontal strips, B′, substantially as and for the purpose set forth.

7. In a revolving book-case, the combination of the quadrangular platform or solid upper shelf, C′, a series of shelves parallel with said platform, and vertical strips at one end of said shelves adjacent to the corners, substantially as and for the purpose specified.

8. In a revolving book-case suspended upon a post, and having a series of shelves provided with horizontal strips projecting therefrom to retain books thereon, the quadrangular platform or solid upper shelf, C′, above said post, substantially as and for the purpose specified.

JOHN DANNER.

Witnesses:
GEO. W. RAFF,
C. B. CAMPBELL.